United States Patent [19]

Hodgkinson et al.

[11] 4,274,139
[45] Jun. 16, 1981

[54] DIGITAL TELECOMMUNICATION NETWORK HAVING IMPROVED DATA PROCESSING SYSTEMS

[75] Inventors: Susan D. Hodgkinson, Winchester; Peter Homan, Romsey, both of England

[73] Assignee: International Business Machines Corporation, Armonk, N.Y.

[21] Appl. No.: 30,663

[22] Filed: Apr. 16, 1979

[30] Foreign Application Priority Data

Jun. 15, 1978 [GB] United Kingdom ............... 27003/78

[51] Int. Cl.³ ............................................. G06F 15/16
[52] U.S. Cl. .................................................. 364/200
[58] Field of Search .......................... 364/200 MS File

[56] References Cited

U.S. PATENT DOCUMENTS

| | | | |
|---|---|---|---|
| 3,348,210 | 10/1967 | Ochsner | 364/200 |
| 3,444,525 | 5/1969 | Barlow et al. | 364/200 |
| 3,462,741 | 8/1969 | Bush et al. | 364/200 |
| 3,483,520 | 12/1969 | Broderick et al. | 364/200 |
| 3,614,745 | 10/1971 | Podvin et al. | 364/200 |
| 3,648,256 | 3/1972 | Paine et al. | 364/200 |
| 3,753,234 | 8/1973 | Gilbert et al. | 364/200 |
| 3,934,232 | 1/1976 | Curley et al. | 364/200 |
| 4,004,277 | 1/1977 | Gavril | 364/200 |

FOREIGN PATENT DOCUMENTS 1411182 10/1975 United Kingdom .
1476212 6/1977 United Kingdom .

OTHER PUBLICATIONS

"Customer Information Control System/Virtual Storage (CICS/VS) Version 1, Release 4 System/Application Design Guide", No. SC33-0068-1, Chapter 13, Intersystem Communication, *IBM*, Jun. 1978.

*Primary Examiner*—Raulfe B. Zache
*Attorney, Agent, or Firm*—Charles P. Boberg; Roy R. Schlemmer, Jr.

[57] ABSTRACT

A plurality of digital data processing systems are interconnected as nodes in a telecommunication network. When two intelligent nodes are conneected and one local node determines that a process which it is executing requires the use of resources held at the second remote node, the local system sends a request to the remote system. It is desirable that the remote system handle the request from the local system as it handles all other requests so that source integrity is maintained. The local system, in response to a request from a local application program which it is sevicing, sends a corresponding transaction request along a communication link to the remote system. This transaction request passes directly from node to node without going through any intermediate controller. The remote system receives the request and creates a new unit of work. The remote system then performs the unit of work and sends the result back to the local node. The local system receives the result and returns it to the requesting application program.

3 Claims, 2 Drawing Figures

DIGITAL TELECOMMUNICATION NETWORK HAVING IMPROVED DATA PROCESSING SYSTEMS

BACKGROUND OF THE INVENTION

This invention relates to digital data processing systems and particularly to such systems in which a plurality of data processing devices are interconnected as nodes in a telecommunication network.

Many users of digital data processing systems have separate processors in each of several geographically remote areas. Each local processing system may have a data base organized to reflect the user's activities in that particular area and its own network of terminals able to inquire of or update the local data base. When requests from one area require data from a data base held in a different area, until now it has been necessary to establish a communication connection between the two areas manually or through some intermediate controller before the appropriate data can be exchanged between the two systems, and to write special code in the application programs making the request. The connection could be made through modems connected to the public telephone switching network, or through dedicated data link lines.

British Pat. No. 1,411,182 describes a data processing system in which a plurality of separately operable data processors are connected to have access to any one of a plurality of memory units. The control of the system is by an allocation device which allocates programs to the processors. A program runs only on one processor, and does not initiate a request for the use of a resource held by a separate processor. British Pat. No. 1,476,212 also describes a data processing system in which a plurality of processors have connections to a common memory or data base. This latter system likewise has no provision whereby a program being run on one processor can initiate a request for the use of a resource held on a different processor.

U.S. Pat. No. 3,483,520 (which is cross-referenced for disclosure purposes to U.S. Pat. No. 3,444,525) shows a system of independently operating data processors, each running its own application program, wherein any processor may send to another processor a request for work to be performed by the second processor in behalf of the first processor. In this system, any such request must be routed through a central controller and cannot pass directly from one processor to the other. An arrangement such as this limits the distance by which each processor may be separated from the other processors in the system and requires that all processors be located in the general vicinity of the central controller. Moreover, it requires the provision and maintenance of special control hardware in addition to the data processors.

None of the above references show processors at locations remote from each other and communicating automatically with each other in the absence of an intermediate controller. It is obviously desirable for users to be able to link geographically remote data processing systems into a network wherein requests from one node of the network for the use of resources held at other nodes of the network can be handled automatically by the system in a direct node-to-node communicating relationship, whether the request is for data, updating a data base or for the processing of data held at a remote location. It is further evident that this type of data communicating relationship is highly useful whether the data processing systems are located in different areas of a common work site or are located many hundreds, if not thousands, of miles from each other. Hence, references to "remote" systems or locations in the present description should not be taken to mean that the intersystem data communication problem just mentioned is limited to systems having widely separated nodes, although this is where the problem becomes most acute.

SUMMARY OF THE INVENTION

In the following description the communication between different data processing systems will be referred to as intersystem communication. The use of the intersystem communication will allow an application program being run on one processing system to initiate transactions at a remote processing system, to access file and data bases held at remote processing systems and to transfer data to or from transient data and temporary storage queues in remote processing systems.

Data processing systems are now organized to perform what is called on-line processing for users, and a processor supports a network of local terminals each of which may be running an application program at the same time as other terminal users are running different application programs or even the same application program. Whereas in the prior conventional batch processing systems the application programmer plans a series of runs to edit batches of input transactions, update master files and write output reports, to optimize total run time and streamline the cycle, the programmer must concentrate on careful manipulation of data. In accomplishing this, the data becomes intricately tied to the program logic and is of little value to other applications.

The on-line real-time data base/data communications (DB/DC) environment differs from the batch processing systems in the amount and types of concurrent activities that are likely to occur within the processing system at a given time. Whereas a batch processing system schedules each application independently and provides data support unique to each application, a DB/DC system controls many transactions arriving on a random non-scheduled basis and provides an integrated data base supporting each application. To do this a DB/DC system requires a control system in addition to the basic operating system that is used for batch applications. Such a control system is the Customer Information Control System (CICS) described in Customer Information Control System (CICS) General Information Manual (GH20-1028-4) published by International Business Machines Corporation. It will be assumed herein that the present-day version (CICS/VS) of this control system is utilized.

In the following description it will be further assumed that the data processing system at each of the nodes of the network has the CICS/VS control system and that communication between systems is by the Virtual Telecommunication Access Method (VTAM) described in ACF/VTAM General Information Manual (GC38-0254) published by International Business Machines Corporation.

According to the invention there is provided a data processing system in which a plurality of program controlled data processing systems are interconnected as nodes in a telecommunication network, at least one of said nodes including an input/output device, with means at each node of the network to process data according to resources associated with that node by setting up and executing a transaction process associated with each particular request or any related requests, characterized in that the system also includes means at each node of the system to determine when a local data processing request involves a transaction that requires the use of resources held at another node of the system, means to transmit the transaction processing request (hereinafter referred to simply as a "transaction request") for the use of that resource to said other node, and means at each of said nodes to receive transaction requests from other nodes in the system and to operate on each transaction request as if it had originated locally by performing a transaction process associated with the request and transmitting the results of processing the transaction to the requesting node.

In order that the invention may be fully understood a preferred embodiment thereof will now be described with reference to the accompanying drawings.

GENERAL DESCRIPTION OF EXEMPLARY SYSTEM

Figure 1:
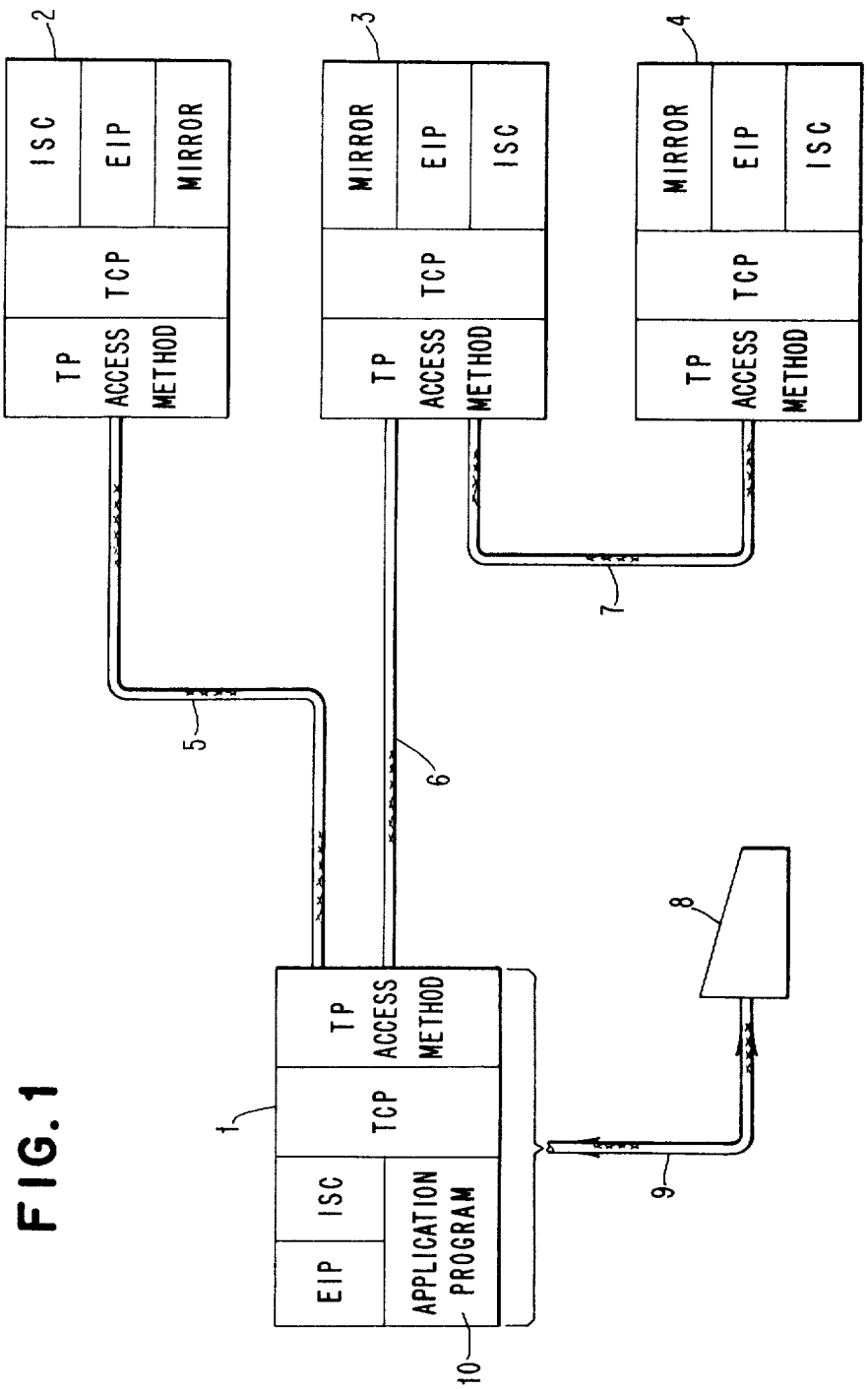
FIG. 1 illustrates in diagrammatic form an exemplary connection scheme for four processing systems in a network embodying the invention.

When an application program (or transaction) on one processing system issues a request for a function to be performed by another processing system, the local processor's CICS/VS control system codes the request and sends it to the system identified in the appropriate CICS/VS table. The receipt of this request at the remote processing system results in the attachment of a CICS/VS "mirror transaction" program module (hereinafter referred to simply as a "mirror transaction" or "mirror") in the remote system. The mirror transaction executes the initiating transaction request and reflects back to the local system the response code and any control fields and data that are associated with the request. If the execution of the request causes the mirror transaction to abend (abnormally end its task), then this information is also reflected back to the system which initiated the transaction request.

The mirror transaction does not free any recoverable resources it has acquired until either the initiating transaction issues the appropriate command to free those resources, or a synchronization point (SYNCPOINT) or RETURN command occurs. On receipt of a SYNCPOINT or RETURN command the mirror transaction terminates. On the other hand, if the resource is not recoverable, the mirror transaction returns information to the local requesting system and terminates.

The mirror transaction is a separate module of CICS/VS and reissues command level requests transmitted to it by remote systems. It executes as a normal CICS/VS transaction and uses the CICS/VS terminal control program facilities to communicate with the requesting system. In the requesting system, the command level EXEC interface program determines that the requested resource is located at a remote system, formats the request for transmission, and calls on an intersystem communication (ISC) component of CICS/VS to send the request to the appropriate connected system.

The intersystem communication component uses CICS/VS terminal control program facilities to send the request to the remote mirror transaction. The first intersystem transaction request to a particular remote system will cause the communication component in the local system to precede the formatted request with the mirror transaction identifier in order to attach this transaction in the remote system. Thereafter it keeps track of whether or not the mirror transaction terminates and reinvokes it as required.

The mirror transaction decodes the formatted request and executes the corresponding command. At the completion of the command the mirror transaction constructs a formatted reply and returns this to the requesting system. In that system the reply is decoded and used to complete the original command level request made by the requesting application program.

If the mirror transaction is not required to update any protected resources, and no previous request updated a protected resource in its system, the mirror transaction will terminate after sending its reply. However, if the request causes the mirror transaction to change or update a protected resource, it will not terminate until the requesting application program issues a sync point request or terminates successfully. When the application program issues a SYNCPOINT request or terminates successfully the intersystem communication component sends a message to the mirror transaction which causes it also to issue a SYNCPOINT request and terminate. The successful SYNCPOINT by the mirror transaction is indicated in a response sent back to the requesting system, which then completes its sync point processing, thereby committing changes to any protected resources.

An application program that initiates a request is not constrained in the order in which it accesses protected or unprotected resources, nor is it affected by the location of protected resources. (They could all be in the remote systems for example). When the application program accesses resources in more than one remote system, the intersystem communication component invokes a mirror transaction in each system to execute requests on behalf of the application program. Each mirror transaction follows the rules set out above for termination, and when the application program reaches a syncpoint, the intersystem communication component exchanges SYNCPOINT messages with those mirror transactions that have not yet terminated. This is referred to as a multiple-mirror situation and is illustrated schematically in FIG. 1, which will be described in more detail hereinafter.

The mirror transaction uses the CICS/VS command level interface to decode and execute a transaction request. The request is thus processed as for any other transaction and the request resource is located in the appropriate resource table. If the entry defines the resource as being remote, the mirror transaction's request is formatted for transmission and sent to yet another mirror transaction in the specified system. This situation is referred to as 'chained mirror' and is also illustrated schematically in FIG. 1 and described hereinafter.

CICS/VS uses a telecommunication access method VTAM (as mentioned above) to establish logical connections with other remote systems. A logical connection is called a "session" and is independent of the physical route selected by VTAM. Within the session, the CICS/VS terminal control program uses specific protocols (or rules) to exchange requests and replies between the intersystem communication component, or ISC, acting on behalf of an application program, and the mirror transaction that will honor the request.

In setting up a logical connection with another remote system, the CICS/VS program of the requesting node requests the VTAM program to establish a session with the required remote system. For intersystem communication each CICS/VS system is defined as a logical unit to the VTAM program and the network. The session is established between the two CICS/VS system logical units. If an application program makes a request that requires a remote resource that is unavailable, that request is terminated with a code that indicates that the remote system is unavailable. If the remote system is in service, but no current session exists, CICS/VS will request VTAM to establish a session. If the session cannot be established immediately, the request will be terminated.

When the intersystem communication component sends a request to a mirror transaction in another system, the session selected is allocated to the requesting application program and the corresponding mirror transaction until the mirror transaction terminates.

While the session is allocated to an application program and mirror transaction in this way, the session cannot be used for a different application program (in either system) which may attempt to send requests to another copy of the mirror transaction in the other system. As soon as the mirror transaction terminates, the session is available for other application programs to make requests, even if the original application program is still running.

An application program making file inquiry requests of a remote system to which there is only a single session allocated will cause the session to be allocated at the time of the request, and released when the mirror transaction in the remote system terminates. Even if the application program continues to interact with its attached terminal, another application program interacting with another terminal may cause allocation of the session for the duration of inquiry and reply. Thus, depending upon the number of inquiry transactions executing and the speed of communication, it is possible for a number of transactions to share a single session between two systems.

DETAILED DESCRIPTION OF A PREFERRED EMBODIMENT

Referring now to the drawings, FIG. 1 shows in diagrammatic form four processing systems 1, 2, 3 and 4 which are connected through telecommunication links shown as the solid lines or cables 5, 6 and 7. Processor 1 is shown as having a data I/O terminal 8 connected through a link 9 which may also be a telecommunication link. In practice, each processor may be supporting a network of terminals (not shown) connected to it either directly or through a network controller such as an IBM 3705. ("IBM" is the registered trademark of International Business Machines Corporation).

In the network chosen for illustration in FIG. 1, processing system 1 has connections 5 and 6 to processing systems 2 and 3, and processing system 3 has a connection 7 to processing system 4. The way in which the invention is put into practice will now be described in an assumed example with reference to FIG. 1. An application program 10 in processing system 1 makes an EXEC request to access files designated FILE X and FILE Z and to initiate a transaction Y (TRNY) using a request identification that processing system 2 defines as protected in the temporary storage table (TST) of processing system 3. A program control table (PCT) of processing system 3 indicates that TRNY is held at processing system 4. Consequently, processing system 1 is in conversation with multiple mirror transactions in processing systems 2 and 3, and the mirror transaction in processing system 3 is chained to a mirror transaction in processing system 4. The operation of the mirror transaction, which is the nub of the current invention, is explained in detail below.

Figure 2:
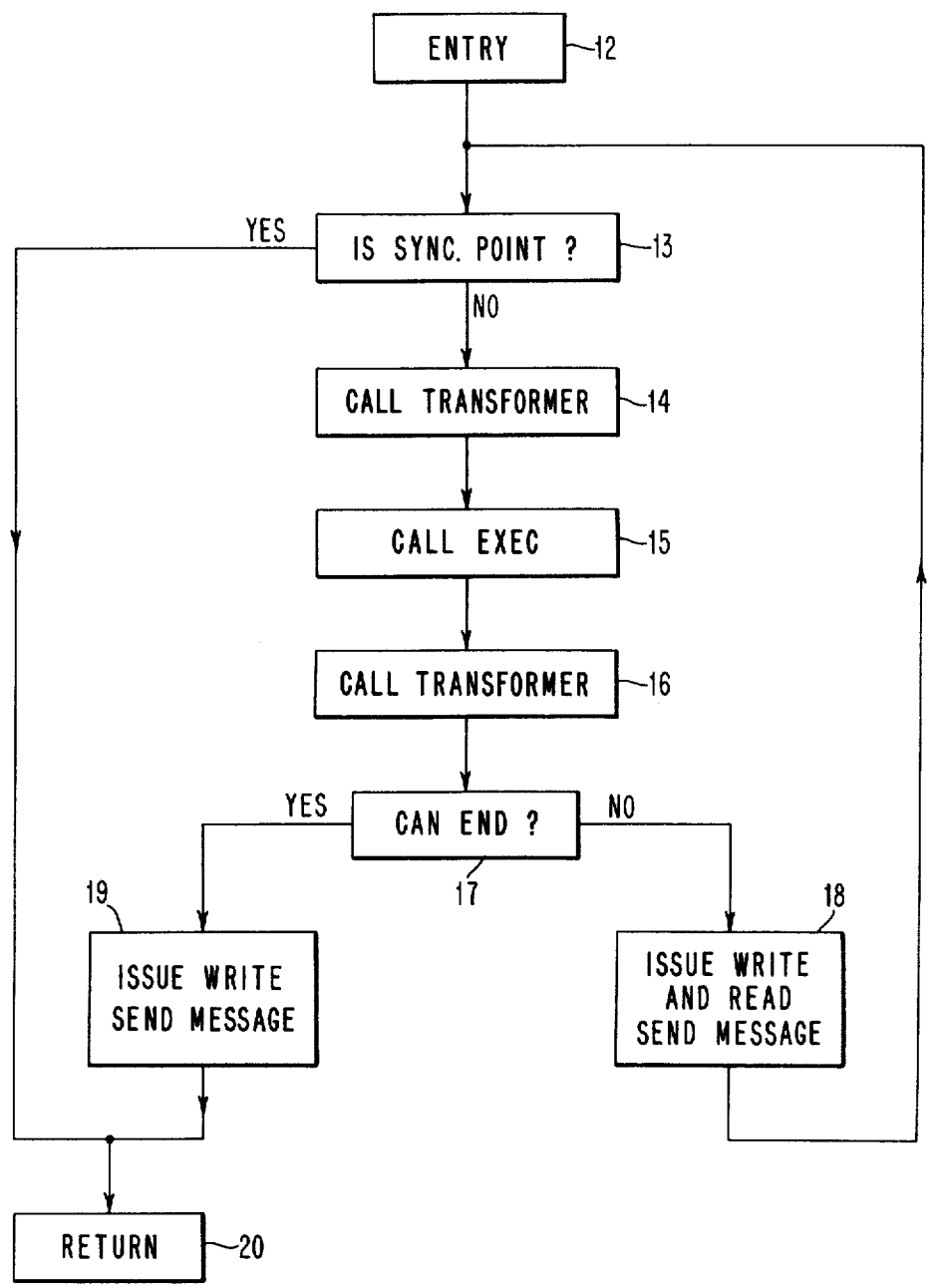
FIG. 2 shows a flow diagram of a mirror transaction program which is a salient feature of the invention.

Referring now to FIG. 2, the flow chart of the mirror transaction is shown. The mirror transaction is able to receive a transformation of a CICS EXEC command and converts that into an EXEC command request using the transformer program. The mirror transaction issues the resultant EXEC command to the CICS program and sends the response and any associated data back to the originator of the request.

On entry point 12 of the mirror transaction program there is a message (transformation of the original application program request) present in the terminal input area for the ISC link. The first decision to be taken at 13 is whether the message merely requests a synchronization point (SYNC POINT). Such messages contain no data, if this is the case then the program returns to the entry point. If the message contains data then a transformer program is called at 14. (See CICS reference manual identified above.) The transformer program re-translates the request from a data-stream format into the original parameter list.

The next step in the mirror transaction program at 15 is to call the CICS Executive program (EXEC) to process the request. (See CICS reference manual).

The reply from the EXEC is converted back to a data stream by the transformer program at 16 ready to be transmitted through the ISC link where it will be re-transformed and returned to the original application program.

The request may have caused information to be acquired by the mirror transaction that may be required on subsequent requests. If this is the case then a decision is taken at 17 to transmit the data and to receive a new request at 18. The new request is then processed starting at 13 as described above. If it is possible for the task to terminate, the data is transmitted by issuing a WRITE command at 19 and returning at 20 to the entry point. The mirror transaction can now terminate, freeing the resources that it holds and the ISC link.

The mirror transaction described above is created and acts in exactly the same way as any other transaction in the system and thus can access all the resources available in the system (e.g., it can maintain locks and preserve the integrity of the system).

Referring again to FIG. 1, provided that in each system 1, 2, 3 and 4 CICS/VS has been generated suitably, then CICS/VS will ensure that the appropriate support routines for intersystem communication are available.

Communication between systems takes place via ACF/VTAM links (see references identified above). CICS/VS and the application program are independent of, and unaware of, the type of physical connection used by ACF/VTAM to connect the two systems.

All remote systems with which a given system is able to communicate are identified and described in terminal control system entries, stored in a table in the local system. The name of the system entry is the name specified in the CICS/VS table entry when referencing a remote resource.

For communication to take place between two systems, each of the systems must have allocated a terminal control table terminal entry (TCTTE) to govern the session with the other system. A session TCTTE is allocated either by the first application task that wishes to send an ISC request to the other system, or by receipt of an ISC request from the other system.

Once a session has been opened, CICS/VS will issue a RECEIVE command to obtain any data being sent by the other system. When the application issues the first request for a remote resource CICS/VS will cancel the RECEIVE command in the local system and instead issue a SEND command to include the transformed data.

Before a request or reply can be transmitted, it must be transformed from its internal parameter list format to a format suitable for transmission, when received after transmission the request must then be transformed back into a parameter list format.

There are four such transformations:

Transformation 1: for a request to be sent by the originating system; transforms from parameter list format to transmission format.

Transformation 2: for a request received by a mirror transaction; transforms from the transmission format to parameter list format.

Transformation 3: for a reply to be sent by the mirror transaction; transforms from parameter list to transmission format.

Transformation 4: for a reply received by the originating system; transforms from transmission format to parameter list format.

There now follows a description of the processes of sending, receiving and replying of and to requests.

A CICS/VS command is handled for an application program by the EXEC interface program (EIP, FIG. 1), which analyzes the argument of each statement to determine the requested function and to assign values into the appropriate CICS/VS control blocks. If the system has been initialized with ISC and if the request is for one of the functions that could be executed on a remote system, then the EIP invokes a local/remote decision routine which inspects the appropriate CICS/VS table to determine if the request is for a local or a remote resource. If the resource is local, control returns to continue normal processing.

If the resource is remote, then the transformer ensures that a session is available (by calling the intersystem program ISC, FIG. 1), transforms the data and then recalls the ISC to send the data and receive a reply to the request.

The ISC uses the terminal control program (TCP, FIG. 1) to perform the I/O operations needed. The TP Access Method (FIG. 1) in the preferred embodiment is ACF/VTAM. (For details see publication mentioned above).

In the remote system the TCP receives the data and ensures that a mirror transaction program is loaded on the system. The mirror transaction program then invokes the EXEC interface program, in the same way as a local application program, passing to it the address of the EXEC parameter list.

The EXEC program invokes the local/remote decision routine which determines if the request is for a remote resource on yet another system, then the procedure is as described with the originating system, or for a local resource.

If the resource is local, control returns to the EXEC program and the command is processed for the mirror program in the usual way.

The process of sending a reply in response to a request from another system is similar to that of sending a request.

When the EXEC command has been successfully completed control is returned to the mirror transaction program (FIG. 2) with the results of the execution. The mirror then calls the transformer program to perform Transformation 3, and after this step invokes the TCP to transmit the reply.

At the system originating the request the TCP receives the reply and returns control to the initiating task (or application program). In particular control is passed initially to the ISC which has been waiting for the reply.

The ISC then invokes the transformer program to perform Transformation 4 in order to transform the reply into the form expected by the initiating task.

Once a session has been allocated to a transaction that is accessing remote resources, allocation requests from other transactions will be queued. It is important, therefore, that conversation between the application and mirror transaction is terminated as soon as possible.

After the mirror transaction has been attached and has processed the first request sent to it, the mirror sends the reply back using a (WRITE,LAST), which causes the session to be freed for use by other applications. The mirror does this unless one of the following conditions is true:

1. The request just processed by the mirror caused a change to a protected resource. In this case, the mirror cannot free the session and terminate. It must stay in conversation with the application until it receives a request to commit changes.
2. The request just processed by the mirror has generated information that is required to process subsequent requests from the same application. For example, a STARTBR request (start browse operation) generates information that is required to process subsequent READNEXT commands.

The mirror transaction always terminates when the application program sends a sync point request.

The preferred embodiment of the invention described above uses the CICS/VS control system and VTAM communication system. It should be realized that other control and communication systems could be used to implement the invention and the concept is not limited to the described embodiment.

A significant feature of the invention is the ability of the mirror transaction program (FIG. 2) to present each transaction request received at a remote node to the data processing system at that node in the same manner as though such a request had originated locally at the receiving node. This enables received transaction requests to be scheduled into the operations of the receiving system without being treated as extraordinary requests necessarily requiring immediate interruption of that system's normally scheduled functions. It is significant also that transaction requests are transmitted in direct node-to-node fashion without having to pass through any intermediate controller hardware which would add materially to the cost of the network.

The foregoing description is concerned primarily with the mirror transaction (or "mirror") feature, FIG. 2, of the data processing systems employed in the illustrative CICS/VS telecommunication network, FIG. 1. The other intersystem communication components of these data processing systems have been described herein to the extent deemed necessary for an adequate understanding of the mirror feature, in which the invention is embodied. If additional information concerning the intersystem communication facilities is desired, such may be obtained from the appropriate technical publications of the International Business Machines Corporation relating to CICS/VS Version 1 Release 4. Reference can be had, for example, to the CICS/VS Version 1 Release 4 System/Application Design Guide Manual, No. SC33-0068-1, particularly Chapter 13 entitled "Intersystem Communication" (Second Edition, June 1978, published September 1978).

Having thus described our invention, what we claim as new, and desire to secure by Letters Patent is:

1. In a data processing system wherein a plurality of program-controlled data processing systems are interconnected as nodes in a telecommunication network, at least one of said nodes including an input/output device, and wherein each node of the network is capable of processing data according to resources associated with that node by setting up and executing a transaction process in response to each particular data processing request and any related requests presented thereto, the combination of:

means at each node of the system for determining when a local data processing request involves a transaction that requires the use of a resource held at another node of the system, means at each node for transmitting the transaction request for the use of such a resource to the other node containing that resource, means at each of said nodes for receiving transaction requests from other nodes in the system and for presenting each received transaction request to the data processing system at the receiving node in the same manner as though such request had originated locally at that node, thereby enabling the local data processing system to perform the transaction process associated with a request from another node as it would perform a transaction process associated with a like request originated at the local node, and means at each of said nodes for transmitting the data resulting from said process to the requesting node.

2. A data processing system as claimed in claim 1 in which the means for transmitting a transaction request includes means to transform data associated with a request for processing at a remote node into a form suitable for transmission between nodes of the network, and the means for receiving a transaction request includes means to transform data received from a remote node into a form suitable for processing by the data processing system.

3. A data processing system as claimed in claim 1 or claim 2 wherein the means for transmitting transaction requests between nodes include direct node-to-node connections affording uninterrupted communication between nodes.

* * * * *